Aug. 19, 1924.
J. TROCHTA
1,505,823
DIRIGIBLE HEADLIGHT FOR AUTOMOBILES
Filed Nov. 23, 1922
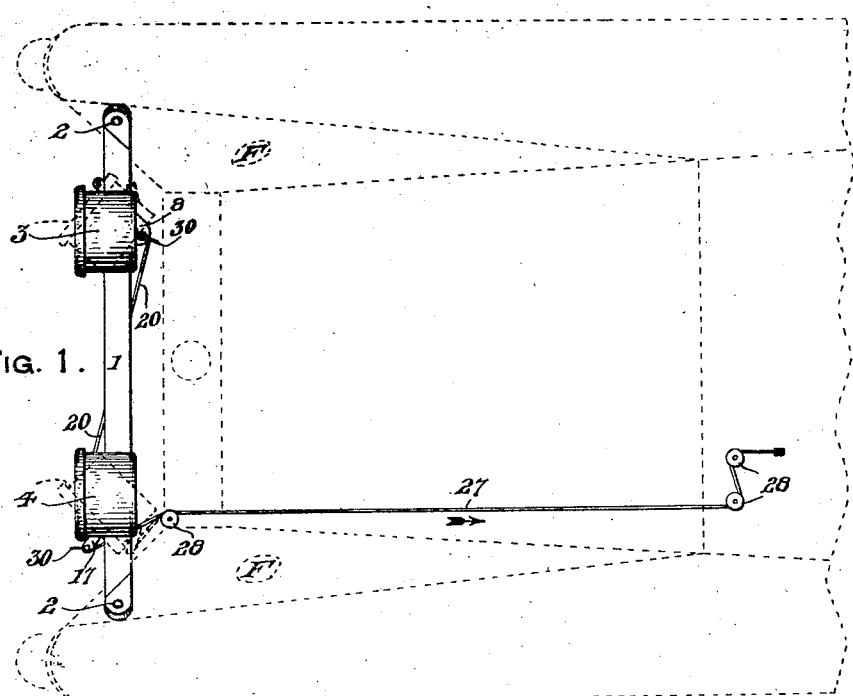
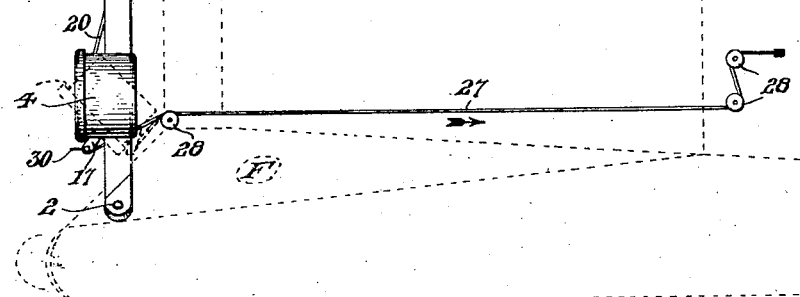
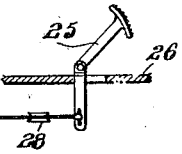
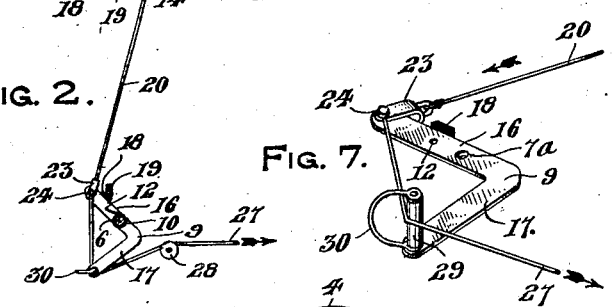
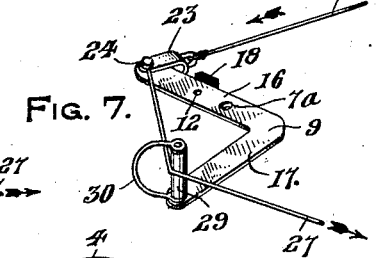
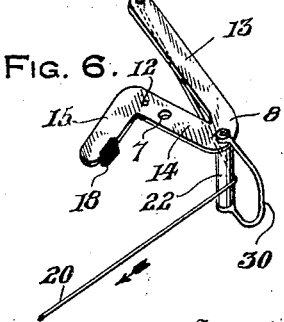
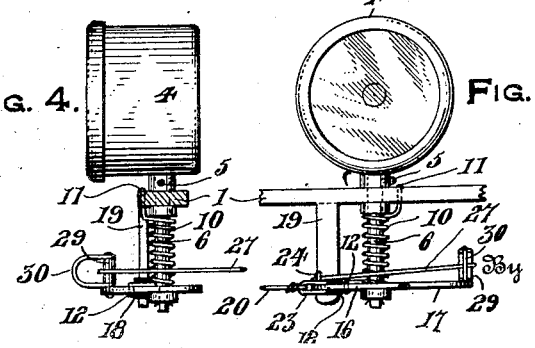
Inventor
John Trochta
By
J. K. Bryant,
Attorney Patented Aug. 19, 1924.

1,505,823

UNITED STATES PATENT OFFICE.

JOHN TROCHTA, OF LEAGUE CITY, TEXAS.

DIRIGIBLE HEADLIGHT FOR AUTOMOBILES.

Application filed November 23, 1922. Serial No. 602,839.

*To all whom it may concern:*

Be it known that I, JOHN TROCHTA, a citizen of the United States of America, residing at League City, in the county of Galveston and State of Texas, have invented certain new and useful Improvements in Dirigible Headlights for Automobiles, of which the following is a specification.

This invention relates to certain new and useful improvements in dirigible lights for automobiles and has particular reference to the idea of a pair of rotatably mounted headlights having an operating cable and lever construction associated therewith for shifting the head light outwardly in opposite directions at each side of the automobile to cause one of the headlights to cast the rays therefrom in a direction toward the adjacent side of the road, while the other headlight during the turning of the automobile is thrown forwardly thereof in the center of the road.

The primary object of the invention resides in the provision of dirigible headlights for automobiles or other motor vehicles wherein a transverse bar supported at its ends upon the forward fenders of a motor vehicle rotatably support adjacent each end thereof, a headlight that is connected with a lever construction disposed beneath the bar with a single flexible connection extending between a foot operated lever and the levers associated with the headlight for shifting the same in opposite directions upon operation of the foot lever.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a top plan view of a dirigible headlight mechanism for automobiles, the same being shown operatively positioned upon an automobile that is illustrated by dotted lines, Figure 2 is a fragmentary horizontal sectional view taken below the supporting bar for the lamps showing the shiftable levers to which the lamps are connected, Figure 3 is a detail sectional view showing the foot operated lever or pedal for operating the flexible connections for the headlights support, Figure 4 is a detail sectional view, showing in side elevation one of the headlights and the supporting and shifting lever associated therewith, Figure 5 is a front elevational view of the headlight and its support shown in Fig. 4, Figure 6 is a perspective view of the lever for shifting one of the lamps, and Figure 7 is a perspective view of the lever for shifting the other lamp.

Referring more in detail to the accompanying drawing, the dirigible headlight mechanism is associated with an automobile that is illustrated by dotted lines in Fig. 1, and including forward fenders F to which the ends of a cross bar 1 are anchored as at 2. The headlights 3 and 4 are each fixed as at 5 to the upper end of a shaft 6 that projects upwardly through the cross bar 1, the lower end of the shaft supporting the headlight 3 being anchored in the opening 7 of the lever 8 while the lower end of the shaft supporting the headlight 4 is anchored in the opening 7ª provided in the lever 9. Each shaft 6 is under tension for force rotation in one direction by the coil spring 10 surrounding the same and being anchored at its upper end as at 11 to the cross bar 1 while the lower end thereof is anchored to the adjacent lever to which the headlight supporting shaft is fixed by inserting the same in the opening 12 provided in the proper lever.

The lever 8 supporting the headlight 3 is shown in detail in Figs. 2 and 6, the same embodying a relatively long leg 13 and a shorter leg 14 diverging relative thereto with the outer end of the shorter leg 14 angularly bent as at 15.

The lever 9 supporting the headlight 4 embodies angle legs 16 and 17 as shown in Figs. 2 and 7. The angle extension 15 of the lever leg 14 as shown in Figs. 2 and 6 carries a buffer 18, while the leg 16 of the lever 9 carries a similar buffer 18 that are adapted to be moved into engagement with the depending arms 19 carried by the cross bar 1 and cooperating with said levers 8 and 9 to form stop devices therefor with the headlights 3 and 4 directly forwardly positioned.

The connection between the levers 8 and 9 embodies a flexible connector 20 anchored to the outer end of the leg 13 of lever 8 as at 21, the flexible connector passing over the depending pin 22 carried by the lever 8 and adapted for connection at its opposite end with the strap 23 connected as at 24 to the outer end of the leg 16 of the lever 9. A foot lever or pedal 25 is pivotally supported through an opening in the floor board 26 of the automobile and has a flexible connector 27 secured to the lower end thereof as shown in Fig. 3, the flexible connector passing over guide rollers 28, and further around the pin 29 carried by the outer end of the leg 17 of the lever 9 to be secured to the anchoring means 24 of the strap 23 as clearly shown in Fig. 7. Each of the pins 22 and 29 carry guard loops 30 to prevent disengagement of the flexible connectors 20 and 27.

In the operation of the device, the headlights 3 and 4 are normally positioned as indicated by full lines in Fig. 1 with the light rays therefrom directed forwardly, and upon operating the foot lever or pedal 25, the flexible connectors 27 attached to the outer end of the leg 16 of the lever 9 will move the lever on its pivot point provided by the shaft 6 journaled in the cross bar 1, the flexible connector 20 simultaneously shifting the lever 8 upon its similar mounting with both of the headlights 3 and 4 shifted for casting the light rays laterally of the adjacent sides of the automobile as shown by dotted lines in Fig. 1. This shifting arrangement is especially desirable in making a turn as the shorter radius of the turn will be illuminated by the adjacent headlight, while the other headlight will illuminate the central portion of the road for substantially evenly distributing the light rays from the two lamps and at the same time fully illuminating the adjacent edge of the road. The springs 10 associated with the post 6 supporting the headlights will restore the same to their forward positions when pressure is relieved on the pedal 25, such movement being limited by the buffers 18 associated with the levers 8 and 9 contacting the depending arms 19 carried by the cross bar 1.

While there is herein shown and described the preferred embodiment of the present invention, it is nevertheless to be understood that minor changes may be made therein without departing from the spirit and scope of the invention as claimed.

What is claimed as new is:—

1. In a dirigible headlight for automobiles, a cross bar supported transversely of the forward end of the automobile, a headlight rotatably supported adjacent each end of the cross bar, a post journaled through the cross bar for supporting each headlight, tension means associated with each post for normally forcing the headlight in one direction, a lever secured to the lower end of each post, one of said levers projecting rearwardly from one post and the other lever projecting forwardly from the other post whereby simultaneous movement of the levers to one side will cause rotation of the posts in opposite directions, cooperating means carried by said levers and cross bar for limiting rotary movement in one direction of the post supporting the headlight, a flexible connector between said levers, a foot lever supported in the floor board of the automobile, a flexible connector between the foot lever and one of the levers associated with a headlight for simultaneously operating the two levers associated with the headlight, and a guide pin for the flexible connectors carried by each post supporting lever.

2. In a dirigible headlight for automobiles, a cross bar supported transversely of the forward end of the automobile, a headlight rotatably supported adjacent each end of the cross bar, a post journaled through the cross bar for supporting each headlight, tension means associated with each post for normally forcing the headlight in one direction, a lever secured to the lower end of each post, one of said levers projecting rearwardly from one post and the other lever projecting forwardly from the other post whereby simultaneous movement of the levers to one side will cause rotation of the posts in opposite directions, cooperating means carried by said levers and cross bar for limiting rotary movement in one direction of the post supporting the headlight, a flexible connector between said levers, a foot lever supported in the floor board of the automobile, a flexible connector between the foot lever and one of the levers associated with a headlight for simultaneously operating the two levers associated with the headlight, a guide pin for the flexible connectors carried by each post supporting lever, and a guard for the flexible connectors carried by each guide pin.

In testimony whereof I affix my signature.

JOHN TROCHTA.